(12) United States Patent
Liu et al.

(10) Patent No.: US 9,977,291 B2
(45) Date of Patent: May 22, 2018

(54) COLOR FILTER SUBSTRATE, ARRAY SUBSTRATE, DISPLAY PANEL INCLUDING COLOR FILTER SUBSTRATE AND ARRAY SUBSTRATE AND DISPLAY DEVICE INCLUDING DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Sha Liu, Beijing (CN); Sangjin Park, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 359 days.

(21) Appl. No.: 14/074,846

(22) Filed: Nov. 8, 2013

(65) Prior Publication Data

US 2014/0152946 A1 Jun. 5, 2014

(30) Foreign Application Priority Data

Nov. 9, 2012 (CN) .......................... 2012 1 0447704

(51) Int. Cl.
*G02F 1/1339* (2006.01)
*G02F 1/1335* (2006.01)
*G02F 7/00* (2006.01)

(52) U.S. Cl.
CPC .... *G02F 1/13394* (2013.01); *G02F 1/133514* (2013.01); *G02F 2201/501* (2013.01)

(58) Field of Classification Search
CPC combination set(s) only.
See application file for complete search history.

(56) References Cited

U.S. PATENT DOCUMENTS

2002/0171800 A1* 11/2002 Miyazaki ............ G02F 1/13394
349/156
2004/0227895 A1* 11/2004 Yoo ................... G02F 1/133516
349/152
2006/0023135 A1* 2/2006 Park .................. G02F 1/136204
349/40

(Continued)

FOREIGN PATENT DOCUMENTS

CN 1877843 12/2006
CN 101251695 8/2008
CN 101713883 5/2010

(Continued)

OTHER PUBLICATIONS

Notification of First Office Action, App. No. 201210447704.4.

(Continued)

*Primary Examiner* — Lauren Nguyen
(74) *Attorney, Agent, or Firm* — Brooks Kushman P.C.

(57) ABSTRACT

The invention provides a color filter substrate, an array substrate, a display panel and a display device. By providing a protective layer used for protecting a peripheral circuit on the array substrate from static electricity-induced corrosion, occurrence of static electricity-induced corrosion in the peripheral circuit on the array substrate can be prevented to improve image quality of LCD device and reduce cost loss caused by a great many of defective products.

11 Claims, 3 Drawing Sheets

(56) References Cited

U.S. PATENT DOCUMENTS

2010/0079694 A1* 4/2010 Yoshida ............ G02F 1/134363
   349/40

FOREIGN PATENT DOCUMENTS

| CN | 102162941 | 8/2011 |
| CN | 102193671 | 9/2011 |

OTHER PUBLICATIONS

Text of the Notification of the Second Office Action, App. No. 2012104477044, dated Dec. 8, 2014.
Office Action issued in corresponding Chinese Application No. 2012104477044 dated Mar. 23, 2015.

* cited by examiner

US 9,977,291 B2

COLOR FILTER SUBSTRATE, ARRAY SUBSTRATE, DISPLAY PANEL INCLUDING COLOR FILTER SUBSTRATE AND ARRAY SUBSTRATE AND DISPLAY DEVICE INCLUDING DISPLAY PANEL

RELATED REFERENCE

This application claims priority from China Patent Application No. 201210447704.4, filed on Nov. 9, 2012, which is also hereby incorporated herein by reference.

BACKGROUND OF THE INVENTION

Field of the Invention

The present invention relates to a technology field of Liquid Crystal Display, particularly relates to a color filter substrate, an array substrate, a display panel and a display device.

Description of the Prior Art

In the existing LCD devices, defective products with abnormal state display are often found. A study shows that a phenomenon of static electricity-induced corrosion exists in signal line on the array substrate (TFT) of display panels in most of the defective products. The phenomenon not only causes products defectiveness, but also more seriously, leads to products being scrapped directly.

And through analysis, it is found that the phenomenon is usually caused by that static electricity occurring between common electrode on color filter substrate (CR) and peripheral circuit on array substrate (TFT) causes signal line to be corroded.

SUMMARY OF THE INVENTION

The present invention provides a color filter substrate, an array substrate, a display panel and a display device, thereby preventing from occurrence of corrosion induced by static electricity in peripheral circuit on array substrate.

The present invention provides solution as following.

Example of the present invention provides a color filter substrate, comprising:

a protective layer used for protecting a peripheral circuit on a array substrate from static electricity-induced corrosion.

Preferably, the protective layer is provided in the area of a color filter substrate corresponding to the peripheral circuit on the array substrate.

After a liquid crystal cell is formed from the color filter substrate and the array substrate, the protective layer is located between a common electrode on the color filter substrate and the peripheral circuit on the array substrate.

Preferably, the protective layer is a spacer.

Preferably, the protective layer is formed of insulation materials.

Preferably, the protective layer comprises one or more strips, and each of strips protects one line of the peripheral circuit on the array substrate.

Example of the present invention also provides an array substrate, comprising a protective layer used for protecting a peripheral circuit on a array substrate from static electricity-induced corrosion.

Preferably, the protective layer is located above the peripheral circuit on the array substrate.

After a liquid crystal cell is formed from the color filter substrate and the array substrate, the protective layer is located between a common electrode on the color filter substrate and the peripheral circuit on the array substrate.

Preferably, the protective layer is provided on a passivated layer or a transparent pixel electrode layer.

Preferably, the protective layer is formed of insulation materials.

Preferably, the protective layer comprises one or more strips, and each of strips protects one line of the peripheral circuit on the array substrate.

Example of the present invention also provides a display panel, wherein the display panel comprises the above color filter substrate in example of the present invention and/or the above array substrate in example of the present invention.

Example of the present invention also provides a display device, wherein the display device comprises the above display panel in example of the present invention.

DETAILED DESCRIPTION OF THE PREFERRED EMBODIMENTS

Figure 1:
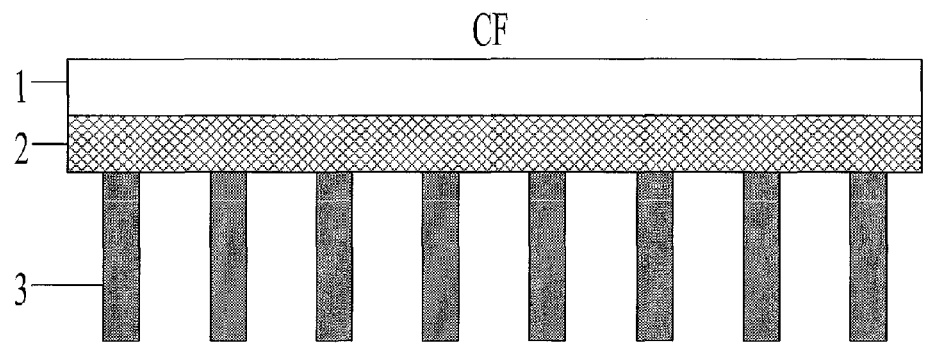
FIG. 1 is a structural schematic diagram 1 of the color filter substrate in example of the present invention.

The present invention provides a color filter substrate, particularly comprising a protective layer used for protecting a peripheral circuit of a array substrate from static electricity-induced corrosion.

The color filter substrate in example of the present invention can prevent from occurrence of static electricity-induced corrosion on the peripheral circuit of the array substrate by providing the protective layer for protecting the peripheral circuit on the array substrate from static electricity-induced corrosion, thereby improve image quality of LCD device and reduce cost loss caused by a great many of defective products.

After analysis, it is found that electrical fields are generated between a common electrode and the signal line because the common electrode (ITO) and the signal line of the peripheral circuit on the array substrate in the color filter substrate (CF) have different voltage separately, and the electrical fields triggers electrostatic breakdown of the signal line metal layer of the peripheral circuit on the array substrate, thereby causes occurrence of static electricity-induced corrosion in the peripheral circuit on the array substrate.

Therefore, to prevent from occurrence of static electricity-induced corrosion, the protective layer related in example of the present invention is preferably provided between the common electrode of the color filter substrate and the peripheral circuit of the array substrate, thereby it can sufficiently protect the peripheral circuit of the array substrate after a liquid crystal cell is formed from a color filter substrate and the array substrate.

As described above, static electricity-induced corrosion is usually caused by static electricity, for more effectively preventing from occurrence of static electricity-induced corrosion in the peripheral circuit on the array substrate, the protective layer related in example of the present invention can be formed of insulation materials, particularly non-electrical conductive materials or materials having the permittivity of greater than 1, e.g. resin, etc. The protective layer can be formed of the same materials with the spacer of the color filter substrate in order to not increase cost.

In example of the present invention, because the protective layer can be formed of insulation materials, generation of static electricity between the common electrode of the color filter substrate and the peripheral circuit of the array substrate can be fundamentally prevented, and thereby corrosion caused by electrostatic breakdown of the peripheral circuit metal layer on the array substrate can be effectively prevented.

The protective layer related in example of the present invention can be provided in the same layer with the common electrode (ITO) of the color filter substrate or the peripheral circuit of the array substrate to achieve protection for the peripheral circuit of array substrate.

Meanwhile, the protective layer can be particularly provided in the area in the color filter substrate corresponding to the peripheral circuit of the array substrate. After the liquid crystal cell be formed from the color filter substrate and the array substrate, it is necessary that the protective layer covers the areas of the array substrate that the peripheral circuit occupies on the array substrate.

The protective layer in the color filter substrate can be located above the peripheral circuit on the array substrate, for example, an output signal line for repair, an input signal line for repair, a gate low voltage, a gate electrode start signal line (STV), an output eliminate blur signal (Xon), an output circuit of signal, a clock pulse vertical signal (CPV) and gate electrode start signal line (STV (0)), etc. Furthermore the protective layer can also be located above via holes of the passivated layer, thereby achieving to cover the peripheral circuit of the array substrate to prevent from static electricity-induced corrosion in peripheral circuit of the array substrate.

The protective layer provided in the color filter substrate can be particularly achieved by the existing layer or the new layer in the color filter substrate.

In a preferred example, the protective layer provided in the color filter substrate can be particularly a spacer provided around the panel.

In that way, the color filter substrate in example of the present invention can be particularly shown as FIG. 1, particularly comprising:

a substrate 1, a common electrode (ITO) 2 on the color filter substrate, a spacer 3 and other devices, such as black matrix, color filter, etc, which is not shown in FIG. 1.

In the example shown in FIG. 1, the spacer 3 (the protective layer) can be particularly geometric shape such as strip etc, that is, the protective layer can be particularly consisted of one or more spacers 3 with strip geometric shape.

Figure 2:
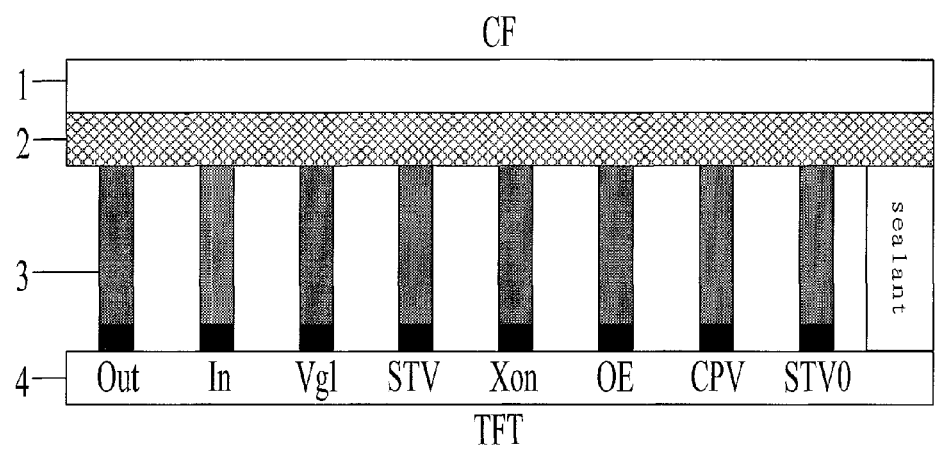
FIG. 2 is a structural schematic diagram 1 of a liquid crystal cell formed from the color filter substrate and the array substrate (i.e. display panel) in example of the present invention.

After the liquid crystal cell is formed from the color filter substrate and the array substrate, as shown in FIG. 2 (symbol 4 indicates substrate of the array substrate, black square symbol indicates signal line of the peripheral circuit of the array substrate), each of spacers 3 (i.e. the protective layer) can cover one line of the peripheral circuit (e.g. STV, CPV, etc) of array substrate based on the contact way. Thus it is achieved to prevent electrostatic corrosion occurring on array substrate peripheral circuit.

Figure 3:
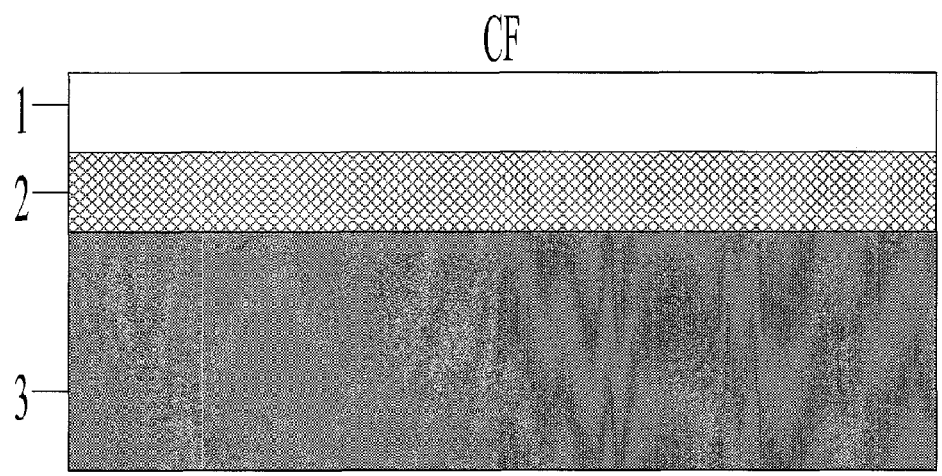
FIG. 3 is structural schematic diagram 2 of the color filter substrate in example of the present invention.

In the other example, as shown in FIG. 3, the spacers 3 (the protective layer) around the panel can also be an integrated structure.

Figure 4:
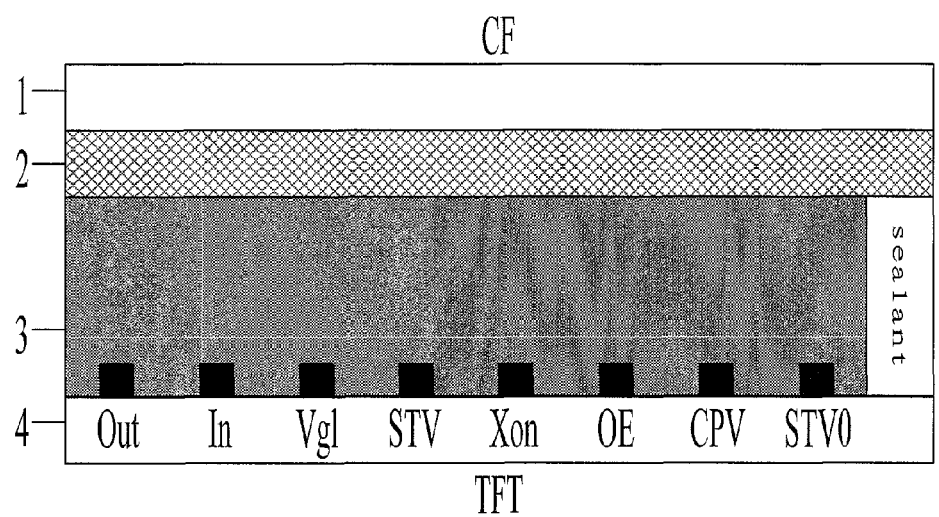
FIG. 4 is structural schematic diagram 2 of a liquid crystal cell formed from the color filter substrate and the array substrate (i.e. display panel) in example of the present invention.

In this way, after the liquid crystal cell is formed from the color filter substrate and the array substrate, as shown in FIG. 4, the spacers 3 cover the peripheral circuit of the array substrate similarly, and also prevent from static electricity-induced corrosion in the peripheral circuit on the array substrate.

As the spacers can be used as the protective layer (or the protective layer which is provided and generated on the same layer with the spacers) in example of the present invention, the layer structure and manufacture process of the existing color filter substrate are not changed.

In example of the present invention, due to the spacers as the protective layer being regularly provided around the panel, it is possible to maintain thickness of the liquid crystal cell effectively, prevent from light leak caused by the following manufacture process.

In the example above, technical solutions in example of the present invention are illustrated in the way that the spacers 3 on the color filter substrate are used as the protective layer, but the protective layer in example of the present invention can also be provided in other layers on color filter substrate. For example, the protective layer is provided in a new layer on the color filter substrate corresponding to the peripheral circuit on the array substrate. Preferably, the new layer is provided between the common electrode on the color filter substrate and the peripheral circuit on the array substrate.

Example of the present invention also provides an array substrate, particularly comprising the protective layer 3 for protecting the peripheral circuit of the array substrate from static electricity-induced corrosion.

From the foregoing, static electricity-induced corrosion is usually caused by static electricity between the common electrode of the color filter substrate and the peripheral circuit of the array substrate. In the example of the present invention, the protective layer 3 in the array substrate can be provided between the common electrode of the color filter substrate and the peripheral circuit of the array substrate. After the liquid crystal cell is formed from the color filter substrate and the array substrate, the protective layer 3 can protect the peripheral circuit of the array substrate effectively.

Preferably, the protective layer 3 on the array substrate can be provided above the peripheral circuit of the array substrate or on the top layer of all layers on the array substrate, e.g. above the pixel electrode (ITO) or the passivated layer.

From the foregoing, static electricity-induced corrosion is usually caused by static electricity, thus the protective layer in example of the present invention can be formed of insulation materials, in order to better prevent from static electricity-induced corrosion in peripheral circuit on the array substrate. Particularly, the materials can be non electrical conductivity or have permittivity of greater than 1, e.g. resin, etc. In order to not increase the manufacture cost, the protective layer can be formed of the same materials with those of an insulating layer (e.g. the passivated layer) on the array substrate.

In example of the present invention, as the protective layer can be formed of insulation materials, the generation of static electricity between the common electrode of the color filter substrate and the peripheral circuit of the array substrate can be fundamentally prevented, and thereby corrosion caused by electrostatic breakdown of the peripheral circuit metal layer on the array substrate can have been effectively prevented.

Figure 5:
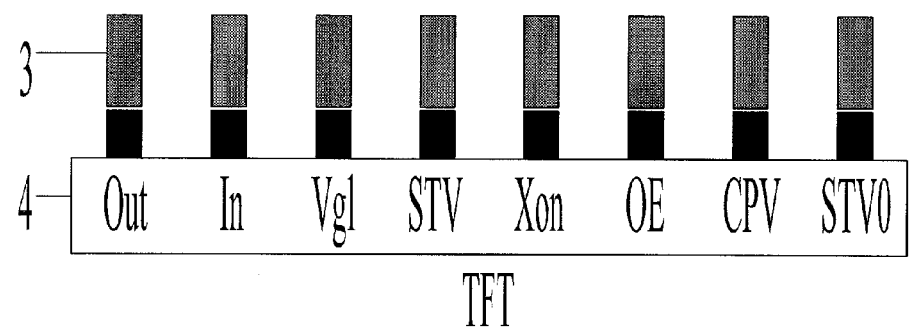
FIG. 5 is structural schematic diagram 1 of the array substrate in example of the present invention.

The protective layer 3 on the array substrate can also be consisted of one or more blocks having geometric shape such as strip etc., as shown in FIG. 5. In FIG. 5, the protective layer 3 is provided above the peripheral circuit, symbol 4 indicates the substrate of the array substrate, and other layers of the array substrate, such as a gate metal layer, a source/drain metal layer, a passivated layer, a pixel electrode layer, alignment layer, etc, are not shown in FIG. 5. That is, each of the protective layers 4 covers one line of the peripheral circuit on array substrate.

It's important to note that, the technical solution of example of the present invention is just illustrated by FIGS. 1-6 shown in the present invention, wherein some layers on the color filter substrate or the array substrate are omitted, and the omitted layers can be provided in the same way with the existing technology.

Figure 6:
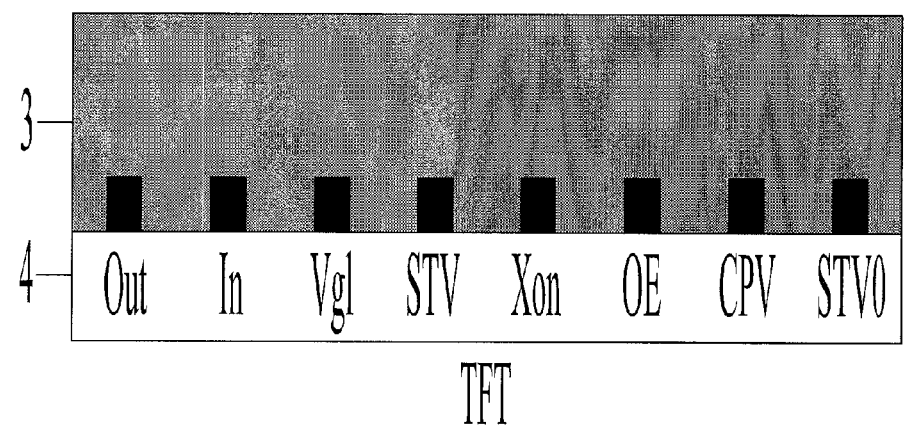
FIG. 6 is structural schematic diagram 2 of the array substrate in example of the present invention.

Similarly, the protective layer 3 on the array substrate can also be an integrated layer, as shown in FIG. 6. In FIG. 6, other layers such as gate metal layer on the array substrate are not shown. That is, the protective layer 3 covers overall of peripheral circuit on the array substrate.

Based on the color filter substrate and/or the array substrate in example of the present invention, example of the present invention can provide a display panel.

The display panel, particularly, can comprise the above color filter substrate and/or the above array substrate in example of the present invention.

That is, the display panel comprises the protective layer for protecting the peripheral circuit on array substrate from static electricity-induced corrosion.

The protective layer particularly can be set between color filter substrate and/or array substrate in the display panel.

Based on the above display panel in example of the present invention, example of the present invention can also provide a display device comprising the display panel in example the present invention.

The display device can be such as a liquid crystal panel, an electronic paper, an OLED panel, a LCD TV, a liquid crystal display, a DPF, a cell phone, a tablet PC and any other products or components having a display function.

From the foregoing, the color filter substrate, the array substrate, the display panel and the display device in example of the present invention can prevent from undesired static electricity-induced corrosion of the peripheral circuit on the array substrate by providing the protective layer for protecting the peripheral circuit of the array substrate from static electricity-induced corrosion static electricity-induced corrosion to improve image quality of LCD device and reduce cost loss caused by a great many of defective products.

Although the embodiments of the present invention have been described, the protection scope of the present invention is not limited thereto. Those changes or substitutions which can be realized by those skilled in the art according to the disclosure of the present invention should be included therein.

What is claimed is:

1. A color filter substrate in a display panel having a liquid crystal cell, a sealer surrounding the liquid crystal cell and an array substrate with a periphery circuit on a side of the sealer distal to the liquid crystal cell, comprising:
   a substrate;
   a common electrode on a side of the substrate; and
   a protective layer for protecting the peripheral circuit of the array substrate from static electricity-induced corrosion caused by static electricity between the common electrode and the periphery circuit;
   wherein the protective layer is in an area of the color filter substrate corresponding to the peripheral circuit;
   wherein the protective layer has a first side and a second side, the first side and the second side are opposite sides of the protective layer in a direction perpendicular to the side of the substrate, and the first side is closer to the substrate than the second side; and wherein the protective layer is formed of insulation materials; and
   wherein the first side is in direct contact with the common electrode, and the second side covers the peripheral circuit after the color filter and the array substrate are integrated into the display panel;
   wherein the protective layer comprises a plurality of spaced strips, and each of the strips protects one line of the peripheral circuit of the array substrate; each of the strips is made of insulation material and is perpendicular to the side of the substrate; the strips directly face each other in a direction parallel to the side of the substrate the common electrode is a continuous layer that is in contact with the plurality of spaced strips of the protective layer.

2. The color filter substrate according to claim 1, wherein the protective layer is a spacer.

3. An array substrate in a display panel having a liquid crystal cell, a sealer surrounding the liquid crystal cell and a color filter substrate with a common electrode, comprising:
   a substrate;
   a peripheral circuit on a side of the substrate at a side of the sealer distal to the liquid crystal cell;
   a protective layer for protecting the peripheral circuit of the array substrate from static electricity-induced corrosion caused by static electricity between the common electrode and the periphery circuit;
   wherein the protective layer is above the peripheral circuit on the array substrate;
   wherein the protective layer has a first side and a second side, the first side and the second side are opposite sides of the protective layer in a direction perpendicular to the side of the substrate, and the second side is closer to the substrate than the first side, the second side is in direct contact with the peripheral circuit, and the protective layer is formed of insulation materials; and
   wherein the first side is in direct contact with the common electrode after the color filter and the array substrate are integrated into the display panel;
   wherein the protective layer comprises a plurality of spaced strips, and each of the strips protects one line of the peripheral circuit of the array substrate; each of the strips is made of insulation material and is perpendicular to the side of the substrate; the strips directly face each other in a direction parallel to the side of the substrate the common electrode is a continuous layer that is in contact with the plurality of spaced strips of the protective layer.

4. A display panel comprising the color filter substrate according to claim 1.

5. A display panel comprising the color filter substrate according to claim 1 and the array substrate according to claim 3.

6. A display panel comprising the array substrate according to claim 3.

7. A display device comprising the display panel according to claim 4.

8. A display device comprising the display panel according to claim 5.

9. A display device comprising the display panel according to claim 6.

10. A display panel comprising:
a color filter substrate with a common electrode on a side of the color filter substrate;
an array substrate with a peripheral circuit;
a liquid crystal cell between the array substrate and the color substrate;
a sealer between the array substrate and the color filter substrate, and surrounding the liquid crystal cell; and
a protective layer between the color filter substrate and the array substrate, for protecting the periphery circuit of the array substrate from static electricity-induced corrosion caused by static electricity between the common electrode and the periphery circuit;
wherein the periphery circuit is on a side of the sealer distal to the liquid crystal cell; the protective layer has a first side and a second side, the first side and the second side are opposite sides of the protective layer in a direction perpendicular to the side of the color filter substrate, and the protective layer is made of insulation material; the first side is in direct contact with the common electrode, and the second side in direct contact with the peripheral circuit;
wherein the peripheral circuit comprises a plurality of signal lines;
wherein the protective layer comprises a plurality of strips, and each of the strips protects one signal line of the peripheral circuit of the array substrate, and each of the plurality of strips has a first end and an opposite second end; the first end is at the first side and in direct contact with the common electrode; the second ends of the plurality of strips are at the second side and in direct contact with the signal lines in a one-to-one manner;
wherein each of the strips is made of insulation material and is perpendicular to the side of the color filter substrate; the strips directly face each other in a direction parallel to the side of the color filter substrate the common electrode is a continuous layer that is in contact with the plurality of spaced strips of the protective layer.

11. The display panel according to claim 10, wherein the signal lines comprises at least one of an output signal line for repair, an input signal line for repair, a gate low voltage signal line, and a gate electrode start signal line.

* * * * *